(12) United States Patent
Chiba

(10) Patent No.: US 9,659,719 B2
(45) Date of Patent: May 23, 2017

(54) DISPLAY SWITCH

(71) Applicant: YAZAKI CORPORATION, Tokyo (JP)

(72) Inventor: Shingo Chiba, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 26 days.

(21) Appl. No.: 14/526,094

(22) Filed: Oct. 28, 2014

(65) Prior Publication Data

US 2015/0043193 A1    Feb. 12, 2015

Related U.S. Application Data

(63) Continuation of application No. PCT/JP2013/062868, filed on Apr. 26, 2013.

(30) Foreign Application Priority Data

May 9, 2012  (JP) ................................ 2012-108005

(51) Int. Cl.
*G01D 11/28* (2006.01)
*H01H 9/18* (2006.01)
(Continued)

(52) U.S. Cl.
CPC ............ *H01H 9/182* (2013.01); *B29C 45/16* (2013.01); *B60K 35/00* (2013.01); *B60Q 3/20* (2017.02); *B60Q 3/74* (2017.02); *B60Q 3/82* (2017.02); *H01H 13/023* (2013.01); *B29C 2045/1682* (2013.01); *B60K 2350/1036* (2013.01); *B60K 2350/203* (2013.01); *B60K 2350/2039* (2013.01); *B60K 2350/967* (2013.01); *H01H 2219/062* (2013.01); *H01H 2219/064* (2013.01); *H01H 2229/046* (2013.01); *H01H 2231/026* (2013.01)

(58) Field of Classification Search
CPC ............. H01H 9/182; H01H 2219/062; B60Q 3/002–3/005
USPC ................................ 362/23.05, 23.08, 23.16
See application file for complete search history.

(56) References Cited

U.S. PATENT DOCUMENTS 5,562,928 A    10/1996 Ando et al.
2005/0174792 A1    8/2005 Matsuura
(Continued)

FOREIGN PATENT DOCUMENTS

CN    101303819 A    11/2008
CN    101728100 A    6/2010
(Continued)

OTHER PUBLICATIONS

International Search Report and Written Opinion of the International Search Report for PCT/JP2013/062868 dated Aug. 8, 2013.
(Continued)

*Primary Examiner* — Sean Gramling
(74) *Attorney, Agent, or Firm* — Kenealy Vaidya LLP

(57) ABSTRACT

A display switch includes a holding portion that formed by a light guide member and adapted to hold a held portion, and a display portion that is integrally formed with the holding portion by the light guide member, is embedded in a light shielding portion, and emits light by guiding a light irradiated to the holding portion.

8 Claims, 15 Drawing Sheets

(51) Int. Cl.
- *B29C 45/16* (2006.01)
- *H01H 13/02* (2006.01)
- *B60K 35/00* (2006.01)
- *B60Q 3/82* (2017.01)
- *B60Q 3/74* (2017.01)
- *B60Q 3/20* (2017.01)

(56) References Cited

U.S. PATENT DOCUMENTS

| | | |
|---|---|---|
| 2006/0102456 A1 | 5/2006 | Kajiwara et al. |
| 2012/0000757 A1 | 1/2012 | Ikeda |
| 2012/0200475 A1* | 8/2012 | Baker .................... G09F 13/04 345/4 |
| 2012/0307479 A1* | 12/2012 | Toh ....................... H01H 9/182 362/23.01 |

FOREIGN PATENT DOCUMENTS

| | | |
|---|---|---|
| DE | 10 2006 023 593 A1 | 11/2007 |
| JP | 61-190627 U | 11/1986 |
| JP | 7-88884 A | 4/1995 |
| JP | 8-287770 A | 11/1996 |
| JP | 2000-173379 A | 6/2000 |
| JP | 2005-225257 A | 8/2005 |
| JP | 2008-192407 A | 8/2008 |
| JP | WO 2011102174 A1 * | 8/2011 ............. H01H 9/182 |
| JP | 2012-15014 A | 1/2012 |

OTHER PUBLICATIONS

Chinese Office Action for the related Chinese Patent Application No. 201380024239.6 dated Nov. 3, 2015.
Japanese Office Action for the related Japanese Patent Application No. 2012-108005 dated Jan. 5, 2016.
Chinese Office Action for the related Chinese Patent Application No. 201380024239.6 dated May 27, 2016.
Japanese Office Action for the related Japanese Patent Application No. 2012-108005 dated Jul. 26, 2016.
Chinese Office Action for the related Chinese Patent Application No. 201380024239.6 dated Nov. 21, 2016.

* cited by examiner

SEC A-A

SEC B-B

<ENLARGED VIEW>

DISPLAY PORTION IS
LIGHT-EMITTING

SWITCH KNOB

SEC E-E

DIFFUSION MATERIAL IS CONTAINED IN THE LIGHT
TRANSMITTING RESIN TO DISPERSE LIGHT, AND
THUS, LIGHT UNEVENNESS IS NOT CONSPICUOUS

LIGHT UNEVENNESS IS NOT CONSPICUOUS

DISPLAY SWITCH

CROSS REFERENCE TO RELATED APPLICATIONS

This application is a continuation of PCT application No. PCT/JP2013/062868, which was filed on Apr. 26, 2013 based on Japanese Patent Application No. 2012-108055 filed on May 9, 2012, the contents of which are incorporated herein by reference.

TECHNICAL FIELD

The invention relates to a display switch, and more particularly to a display switch provided on a switch knob for a vehicle.

BACKGROUND ART

In a conventional switch knob A, as shown in FIG. 14, a pressing bar 33 is formed by a light guidable material and is extended from a center back surface of a knob operation surface 31a toward a light-emitting surface 21f of an input member 21a of a push button switch 21 to guide light, which is incident from the light-emitting surface 21f, to a display portion 31b. When the knob operation surface 31a is pressed, the pressing bar 33 presses the input member 21a of the push button switch 21, thereby a contact portion 21c is operated (for example, see PTL 1).

CITATION LIST

Patent Literature

PTL 1: JP-A-2008-192407

SUMMARY OF INVENTION

Technical Problem

An enlarged portion 33a of the conventional switch knob covers an area larger than that of the display portion 31b in the center portion of an operation portion 31 and the pressing bar 33 is in a conical shape in which the cross-sectional area becomes larger as a measurement position gets closer to the enlarged portion 33a. In addition, the light of the light-emitting surface 21f of the input member 21a passes through the inside of the pressing bar 33 and is guided to the operation unit 31 while being diffused in the enlarged portion 33a, and as a result, the display portion 31b is illuminated. Also, at this time, in the enlarged portion 33a of the pressing bar 33, the light is spread to become a uniform light amount over an end surface thereof facing the operation portion 31, on the basis of the conical shape thereof. In this case, because the pressing bar 33 is disposed to be overlapped with the display portion 31b of the knob operation surface 31a, the display portion 31b can be completely illuminated thereover.

In this way, to allow the light to be spread to become the uniform light amount and thus to be completely illuminated over the display portion 31b, the conventional switch knob has the pressing bar 33 formed in the conical shape and also has the enlarged portion 33a covering an area larger than that of the display portion 31b. As a result, when the operation portion 31 and the pressing bar 33 are one-color molded as shown in FIG. 15A, a thickness of a portion of the switch knob, on which the enlarged portion 33a is covered, is extremely thick relative to a thickness of a portion, on which the enlarged portion 33a is not covered, and as a result, a sink mark can be easily created as shown in FIG. 15B. The sink mark is a shape deterioration due to shrinkage in a cooling process after molding.

Solution to Problem (1) A display switch includes a holding portion and a display portion. The holding portion is formed by a light guide member and adapted to hold a held portion. The display portion is integrally formed with the holding portion by the light guide member, is embedded in a light shielding portion, and emits light by guiding a light irradiated to the holding portion.

(2) In the display switch of (1), the display portion is adapted such that a portion of the display portion other than a portion which is integrally formed with the holding portion is exposed to a light source, and the display portion emits light by guiding a light irradiated to the exposed portion from the light source.

(3) In the display switch of (2), the display portion and the light shielding portion are two-color-molded.

(4) In the display switch of (3), the held portion is connected to a push switch for turning the light source on/off by pressing.

Advantageous Effects of Invention

According to the configuration (1), a required portion can be light-emitted as the display portion so that there is no need for light to be completely illuminated over the switch knob. Also, the light guide portion and the light shielding portion are formed by different members so that differences between thicknesses of each portion can become smaller, thereby inhibiting a sink mark.

According to the configuration (2), the light is guided from the exposed portion to the display portion, thereby enhancing illuminance of the display portion. Namely, the light of the light source is guided through a plurality of light guide portions, so that the display portion can receive much light, thereby increasing light-emitting illuminance of the display portion.

According to the configuration (3), the display portion is directly light-emitted so that there is no need for light to be completely illuminated over the switch knob and the light shielding portion can be thinly formed, thereby inhibiting a sink mark.

According to the configuration (4), the holding portion, which holds the held portion, is pressed to turn the light source on/off, and thus the holding portion serves as a light guide portion and at the same time, serves as a pressing force transferring portion for transferring the pressing force to the push switch.

According to the display switch of the exemplary embodiment, a required portion can be light-emitted as the display portion so that there is no need for light to be completely illuminated over the switch knob. Also, the light guide portion and the light shielding portion are formed by different members so that differences between thicknesses of each portion can become relatively smaller, thereby inhibiting a sink mark.

DESCRIPTION OF EMBODIMENTS

Figure 1:
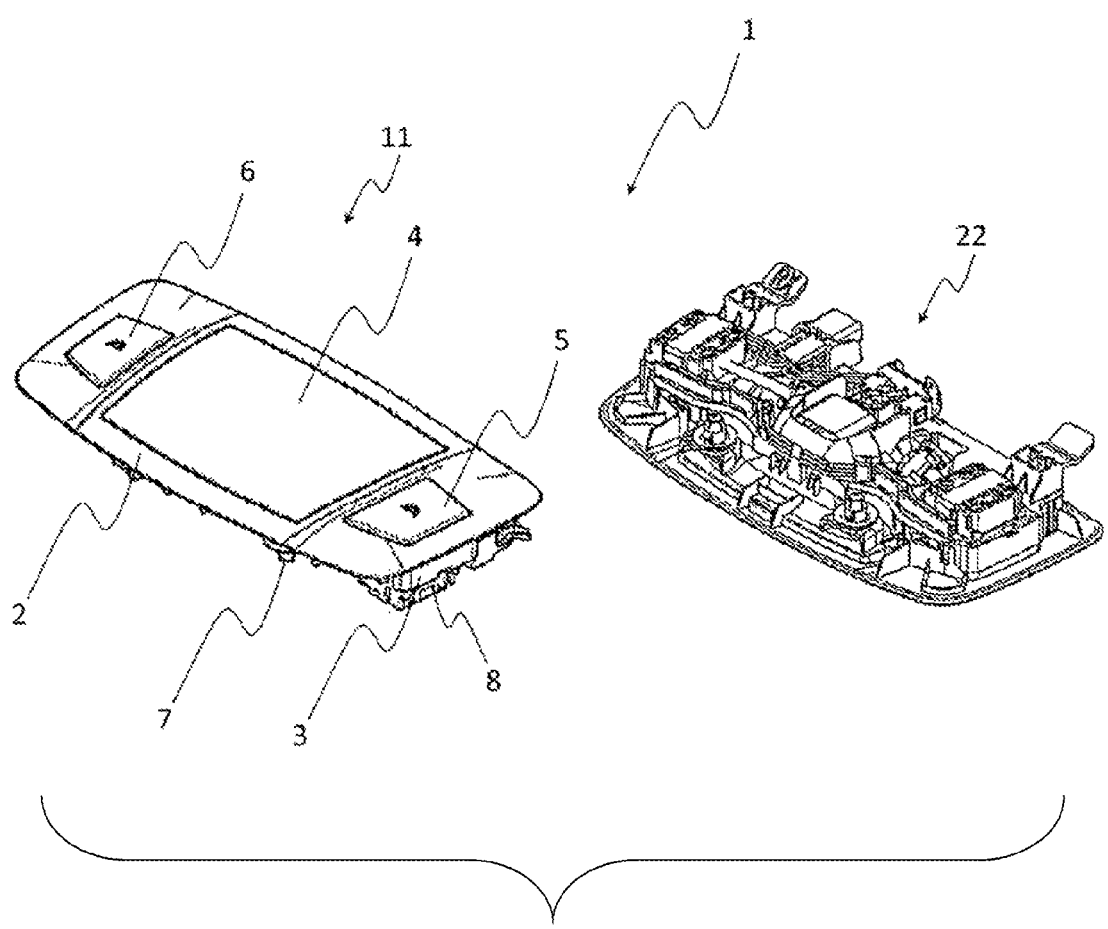
FIG. 1 is a view showing an example of a vehicle illumination device including a switch knob (display switch).

A display switch according to an embodiment of the present invention will be now described with reference to the accompanying drawings. FIG. 1 is a view showing an example of a vehicle illumination device including a switch knob (display switch) according to the present embodiment. As shown in FIG. 1, the vehicle illumination device 1 includes a lamp unit 11 and a body 22. The lamp unit 11 includes a bezel 2, a housing 3, a lens 4, a left switch knob 5, a right switch knob 6, a resin clip 7, and a wire harness sub-assembly (W/H SUB ASSY) 8. The lens 4, the left switch knob 5 and the right switch knob 6 are mounted on the bezel 2. The bezel 2 and the wire harness sub-assembly 8 are mounted on the housing 3. The lamp unit 11, on which the bezel 2, the housing 3, the lens 4, the left switch knob 5, the right switch knob 6, and the wire harness sub-assembly 8 are mounted, is mounted on the body 22 by the resin clip 7.

Figure 2:
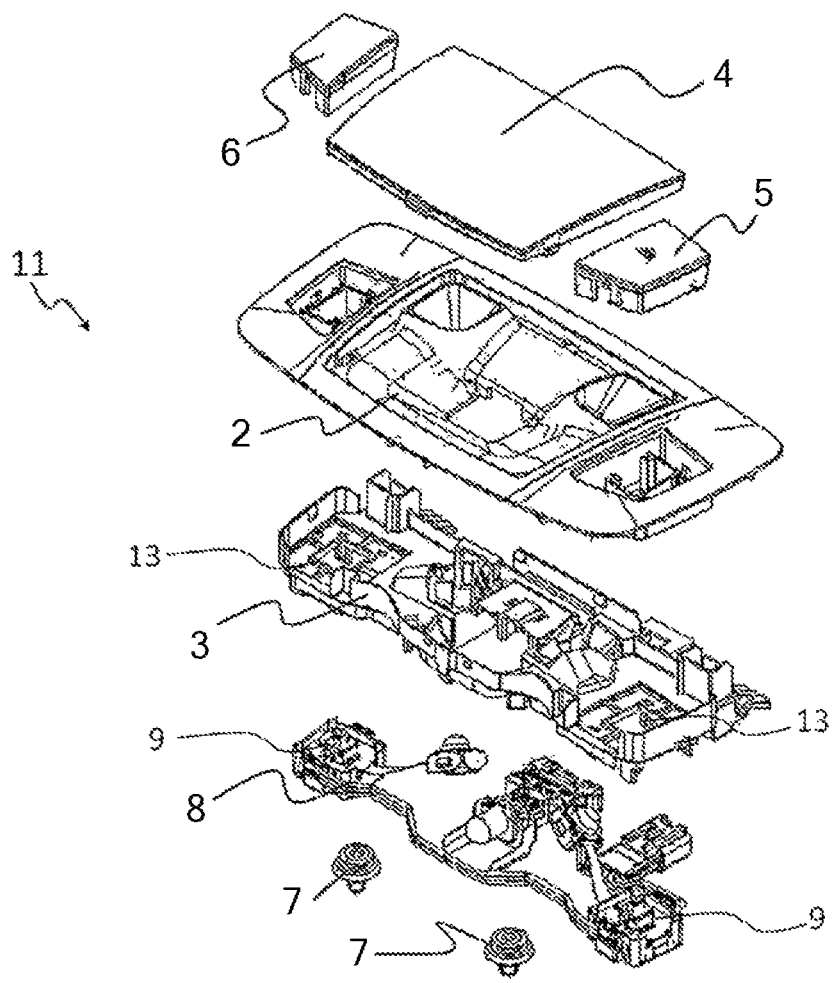
FIG. 2 is an exploded view showing a lamp unit.

FIG. 2 is an exploded view showing the lamp unit 11. As shown in FIG. 2, the lamp unit 11 includes the bezel 2, the housing 3, the lens 4, the left switch knob 5, the right switch knob 6, the resin clip 7 and the wire harness sub-assembly (W/H SUB ASSY) 8 mounted therein. Also, the wire harness sub-assembly 8 has a light sourced switch unit 9 on each of both sides thereof (locations opposing to the left switch knob 5 and the right switch knob 6). The light sourced switch units 9 are respectively connected to each of the left switch knob 5 and the right switch knob 6 through holes 13 of the housing 3.

Figure 3A:
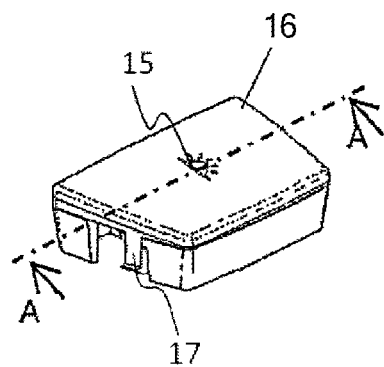
FIG. 3A is a view enlarging a left switch knob.
Figure 3B:
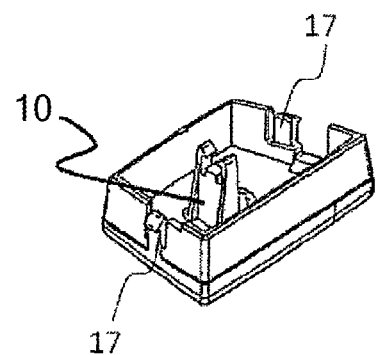
FIGS. 3B and 3C are views showing the left switch knob turned upside down.
Figure 3C:
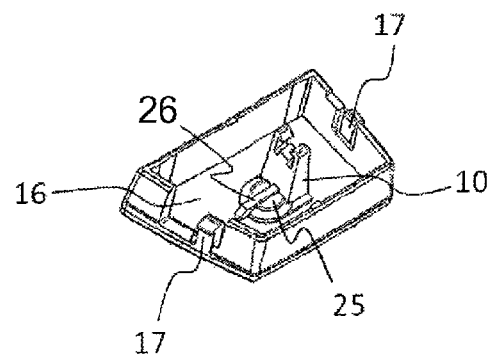
Figure 3D:
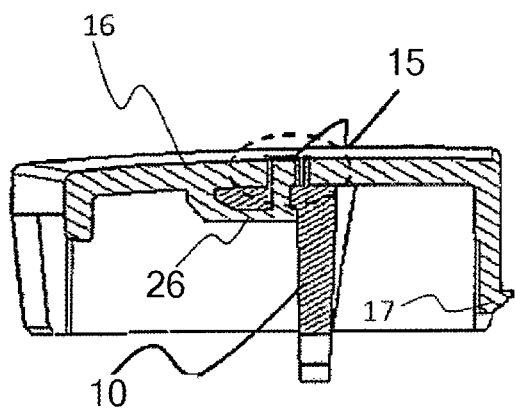
FIG. 3D is a view showing a cross section taken along a dashed line in FIG. 3A as viewed from an arrow A.

FIG. 3A is a view enlarging the left switch knob 5 and FIGS. 3B and 3C are views showing the left switch knob 5 turned upside down. FIG. 3D is a view showing a cross section taken along a dashed line in FIG. 3A as viewed from an arrow A. The right switch knob 6 is formed symmetrically with the left switch knob 5. As shown FIGS. 3A to 3B, the switch knob (the left switch knob 5 and the right switch knob 6) includes a lock arm (holding portion) 10, a display portion 15, a pressing portion 16 and an engaging portion 17. The lock arm (holding portion) 10 is formed by a light guide member (a light transmitting resin or the like) and holds a held portion of the light sourced switch unit 9 extended through the hole 13 of the housing 3. The display portion 15 is integrally formed with the lock arm (holding portion) 10 by a light guide member and is embedded in the pressing portion (light shielding portion) 16 formed by a light shielding member (a light non-transmitting resin or the like). When the pressing portion 16 is pressed, the pressing is exerted to the light sourced switch unit 9 through the lock arm (holding portion) 10 to turn on/off a light source of the light sourced switch unit 9. The engaging portion 17 allows the switch knob (the left switch knob 5 and the right switch knob 6) to be engaged with the bezel 2 or the housing 3 and can be moved in a pressing direction of the pressing portion 16.

The lock arm (holding portion) 10 is provided near on the inner center of the switch knob, and an extending direction of the lock arm 10 is provided to substantially coincide with a switching operation direction of a push switch of the light sourced switch unit 9. Thus, the lock arm (holding portion) 10 can directly transfer pressing from the pressing portion 16 to the light sourced switch unit 9, thereby enhancing switching operability The display portion 15 includes an exposed portion 25 exposed from the inside of the switch knob. The bypass 26 is integrally formed with the pressing portion 16 by a light shielding member (a non-light transmitting resin or the like) and is connected to the lock arm 10 and at the same time, covers a portion of the exposed portion 25.

Figure 4A:
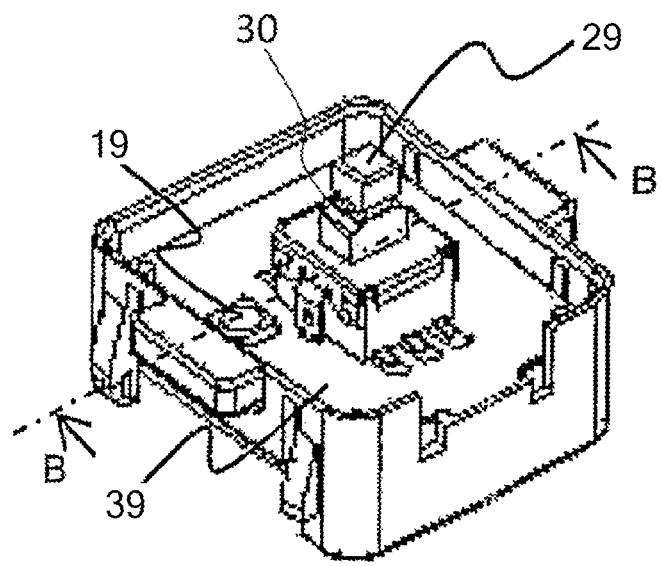
FIG. 4A is a perspective view of a light sourced switch unit.
Figure 4B:
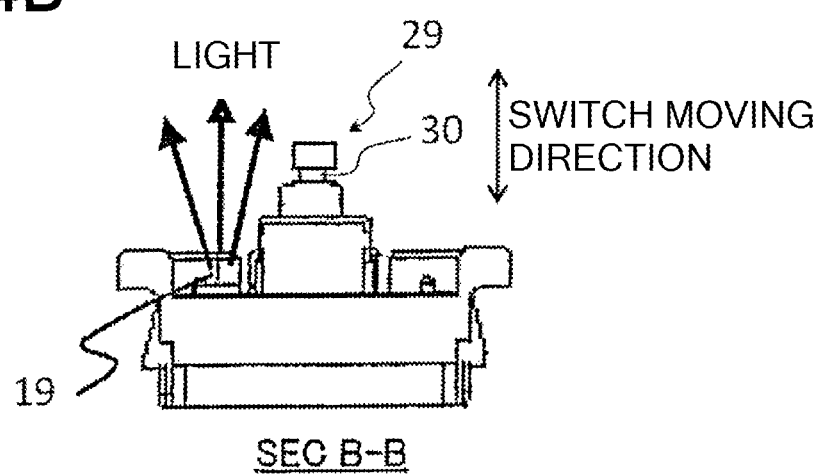
FIG. 4B is a view showing a cross section taken along a dashed line in FIG. 4A as viewed from an arrow B.

FIG. 4A is a perspective view of the light sourced switch unit 9. FIG. 4B is a view showing a cross section taken along a dashed line in FIG. 4A as viewed from an arrow B. As shown in FIG. 4, the light sourced switch unit 9 has the light source (LED) 19, the push switch 29, and a substrate 39. Also, the push switch 29 has a held portion 30.

The held portion 30 is held by the lock arm (holding portion) 10 and transfers pressing of the pressing portion 16 to the push switch 29. The push switch 29 is moved by pressing of the pressing portion 16 in the switching operation direction, thereby turning the light source 19 on/off. The light source 19 is provided on the substrate 39 and also provided near the push switch 29. The light source 19 is arranged such that light from the light source 19 can be directly irradiated to the lock arm (holding portion) 10 and the exposed portion 25.

Because the lock arm (holding portion) 10 is formed by the light guide member, the lock arm (holding portion) 10 can guide the light irradiated from the light source 19. In addition, because the display portion 15 embedded in the pressing portion (light shielding portion) 16 is also formed by the light guide member, the display portion 15 can guide the light irradiated to the lock arm (holding portion) 10 to emit light.

Figure 5:
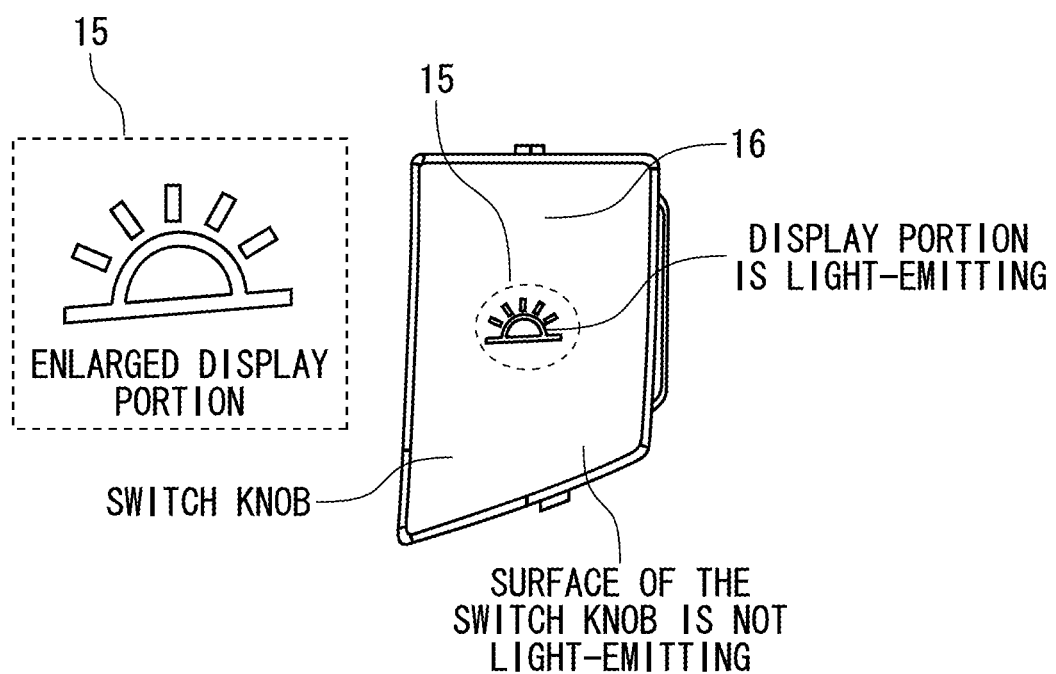
FIG. 5 is a view showing light-emitting of a display portion of a switch knob (left switch knob).

FIG. 5 is a view showing light-emitting of the display portion 15 of the switch knob (the left switch knob 5). As shown in FIG. 5, the display portion 15 is light-emitted by the light guided from the light source 19 through the lock arm 10. Meanwhile, because the pressing portion (light shielding portion) 16, in which the display portion is embedded, is formed by the light shielding member (a non-light transmitting resin or the like), the pressing portion (light shielding portion) 16 is not light-emitted. In this way, a required portion can be light-emitted as the display portion 15, and as a result, there is no need for the light to be spread to become a uniform light amount over an end surface of the pressing portion 16 (or an operation portion) and also to be completely illuminated over the pressing portion 16 (or an operation portion). In addition, a shape of the display portion 15 can be arbitrarily determined.

Figure 6:
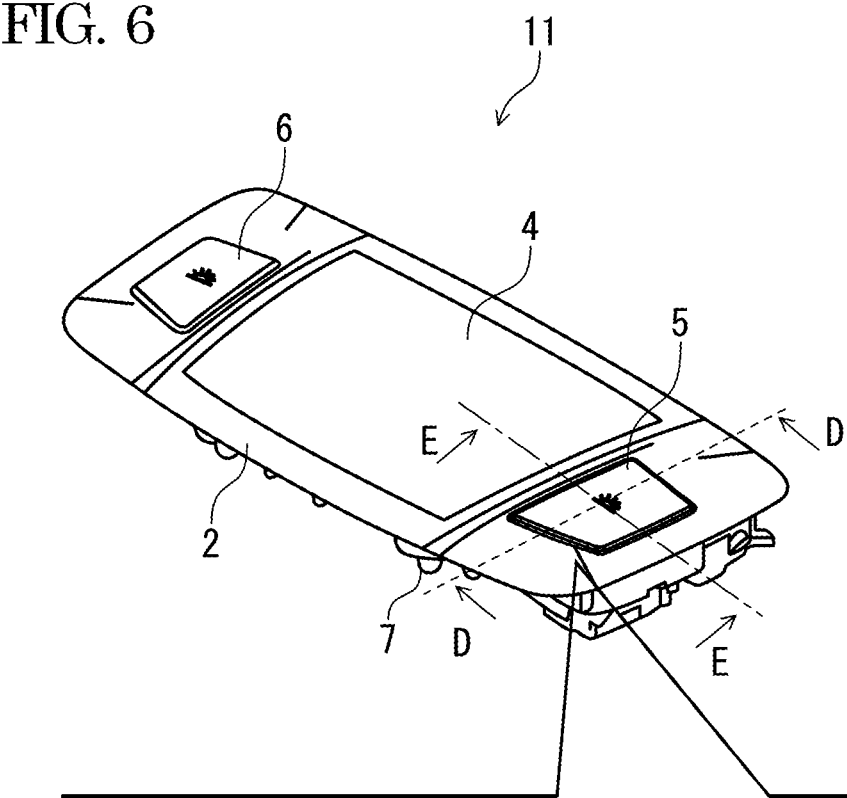
FIG. 6 is a view showing a state in which the switch knob is mounted on the lamp unit.
Figure 6:
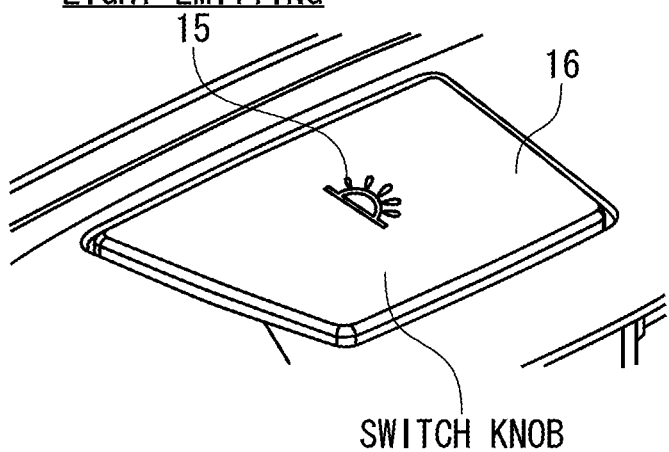

FIG. 6 is a view showing a state in which the switch knob is mounted on the lamp unit 11. As shown in FIG. 6, when the pressing portion 16 of the switch knob is pressed, the light from the light source 19 is guided to the display portion 15, and thus the display portion 15 is light-emitted. Also, in the present embodiment, the display portion 15 displays a vehicle interior light. Therefore, when the pressing portion 16 of the switch knob is pressed, an illumination unit (not shown) provided inside of the lens 4 is light-emitted to serve as an illumination in a vehicle.

Figure 7:
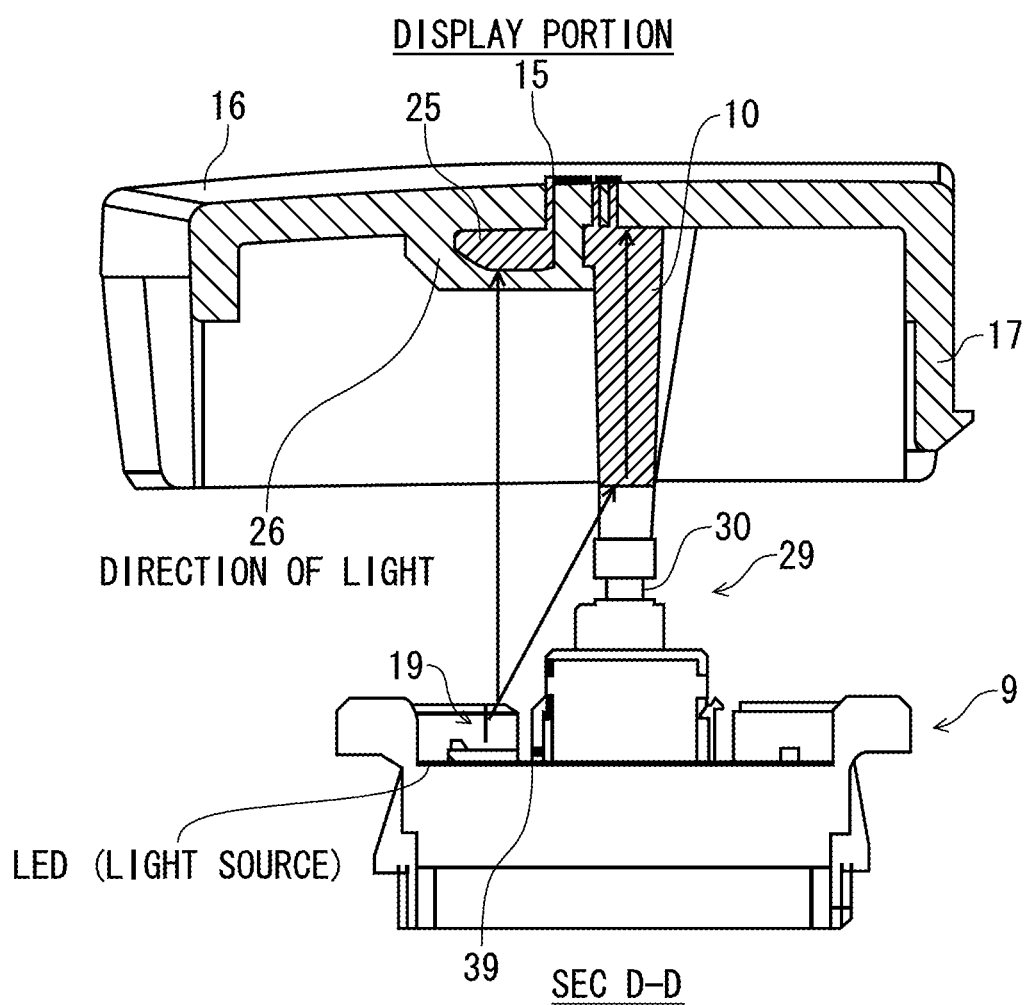
FIG. 7 is a view showing a cross section of the switch knob and the light sourced switch unit taken along a dashed line in FIG. 6 as viewed from an arrow D.

FIG. 7 is a view showing a cross section of the switch knob and the light sourced switch unit 9 taken along a dashed line in FIG. 6 as viewed from an arrow D. As shown in FIG. 7, the lock arm (holding portion) 10 is formed by the light guide member and guides light irradiated from the light source 19 of the switch unit 9 having a light source. The display portion 15 is integrally formed with the lock arm (holding portion) 10 by the light guide member, is embedded in the pressing portion (light shielding portion) 16 and guides the light irradiated to the lock arm 10 to emit light. Also, the display portion 15 is adapted such that a portion thereof (the exposed portion 25) other than a portion which is integrally formed with the lock arm (holding portion) 10 is exposed from the pressing portion (light shielding portion) 16. In the cross sectional view of FIG. 7, the exposed portion 25 is partially covered with the bypass 26, but a portion other than a portion covered with the bypass 26 is exposed to the inside of the pressing portion 16. In addition, the display portion 15 is light-emitted by guiding light irradiated to the exposed portion 25 from the light source 19, which also irradiates light to the lock arm (holding portion) 10. In this way, because light is guided from the lock arm 10 and the exposed 25 to the display portion 15, illuminance of the display portion 15 is enhanced. According to the present embodiment, although the light source 19 is provided on the substrate 39, the light source 19 has only to be provided at an optimal position to enhance the illuminance of the display portion 15. For example, as shown in FIG. 7, the light source 19 may be at a position opposing to the exposed portion 25. Also, the light source 15 may be a high directional light source and thus may directly irradiate light to the lock arm 10 or the exposed portion 25. In addition, the light source 19 may be a plurality of light sources.

Figure 8:
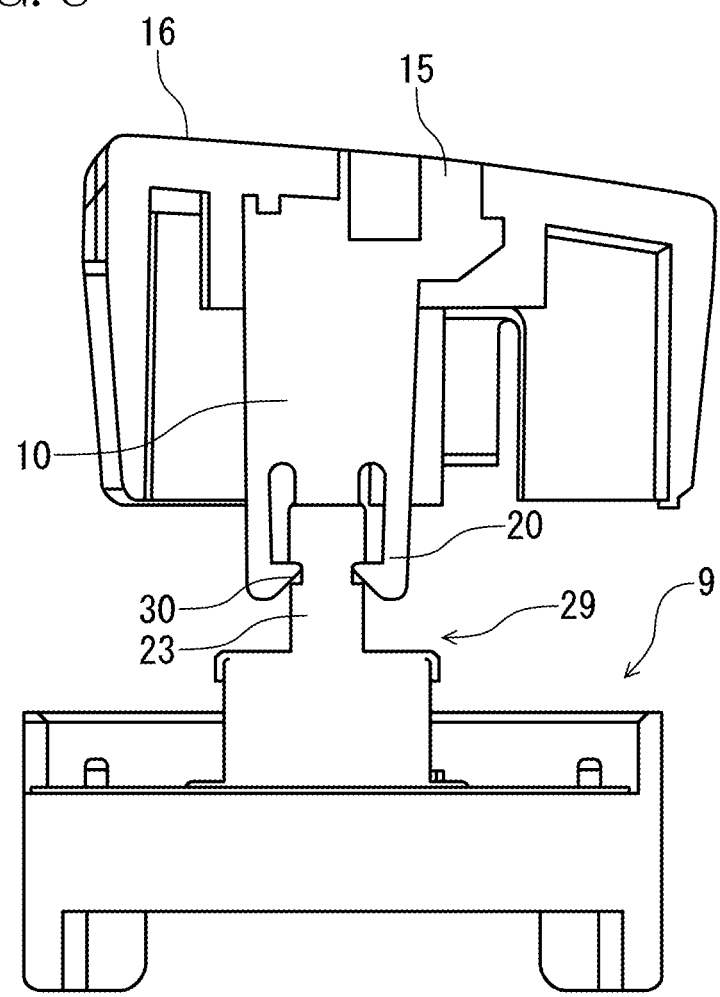
FIG. 8 is a view showing a cross section of the switch knob and the switch unit having a light source, taken along a dashed line in FIG. 6 as viewed from an arrow E.

FIG. 8 is a view showing a cross section of the switch knob and the switch unit 9 taken along a dashed line in FIG. 6 as viewed from an arrow E. As shown in FIG. 8, the lock arm (holding portion) 10 holds the held portion 30. The held portion 30 is connected to the push switch 29 for turning the light source 19 on/off by pressing. In the present embodiment, the held portion 30 is a groove (recessed portion) provided on a protrusion 23 of the push switch 29 in a circumferential direction thereof and is held to the lock arm (holding portion) 10 by engaging an engaging portion 20 of the lock arm (holding portion) 10 with the groove (recessed portion). By pressing the lock arm (holding portion) 10 which holds the held portion 30, the light source 19 is turned on/off, and as a result, the lock arm (holding portion) 10 serves as a light guide portion and at the same time, serves as a pressing force transferring portion for transferring the pressing force to the push switch 29.

Figure 9:
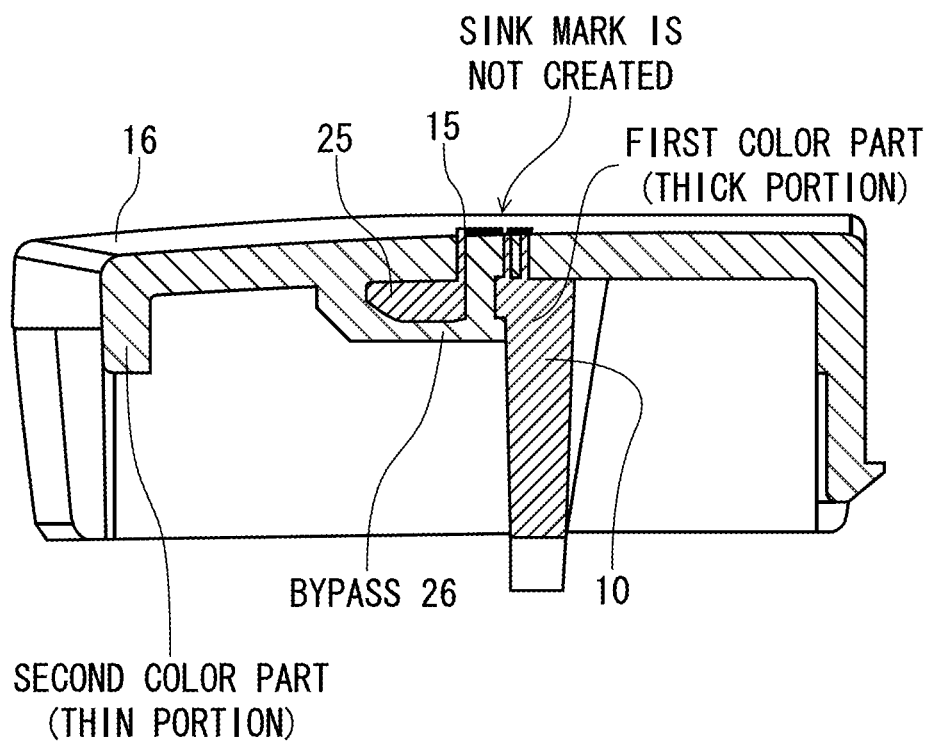
FIG. 9 is a view showing the display portion and a pressing portion (light shielding portion) which are two-color molded.

FIG. 9 is a view showing the display portion 15 and the pressing portion (light shielding portion) 16 which are two-color molded. As shown in FIG. 9, the lock arm (holding portion) 10, the display portion 15 and the exposed portion 25 are integrally formed with each other by the light guide member. Also, the pressing portion 16 is molded on the integrally formed light guide portion (the lock arm 10, the display portion 15 and the exposed portion 25) by two-color molding. In this case, because the display portion 15 emit light, the pressing portion 16 (or an operation portion) does not need to be completely illuminated thereover, and the pressing portion 16 is thinly formed by the light shielding member. In addition, because the display portion 15 and the pressing portion (light shielding portion) 16 are individually molded by two-color molding, a difference between thicknesses in molding can become smaller, as compared with one-color molding, and thus a sink mark is not easily created. In particular, a difference between thicknesses in the pressing portion 16 becomes smaller, and thus a sink mark is not easily created on a surface of the pressing portion 16. As a result, the sink mark on the surface of the pressing portion 16, which is an exterior portion of the switch knob and is actually contacted and pressed by an operator, can be inhibited, thereby enhancing aesthetic sense or operability of the switch knob.

In the foregoing, although the embodiments according to the preset invention has been described, the invention is not limited to the embodiments, but changes and modifications thereof can be made within the scope defined by the claims.

Figure 10A:
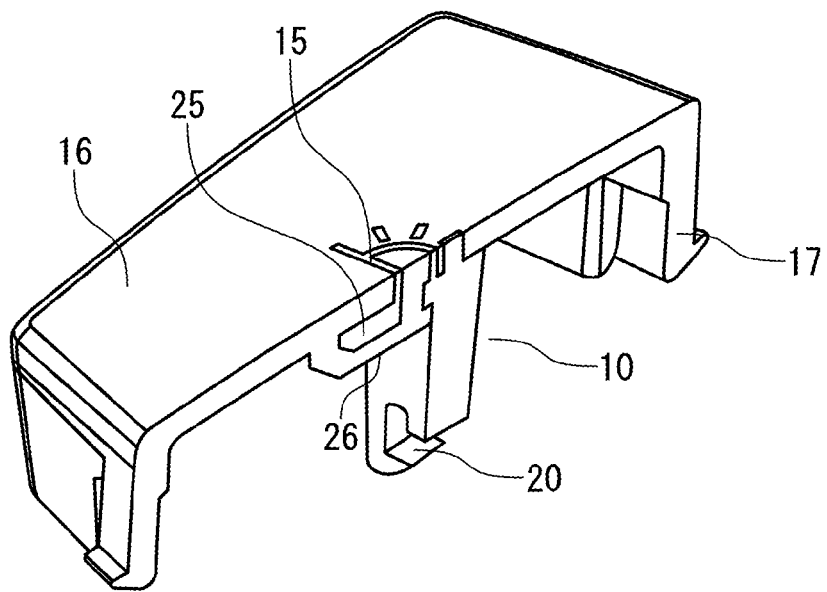
FIG. 10A is a perspective view of the switch knob cut along the dashed line indicated by the arrow D in FIG. 6.
Figure 10B:
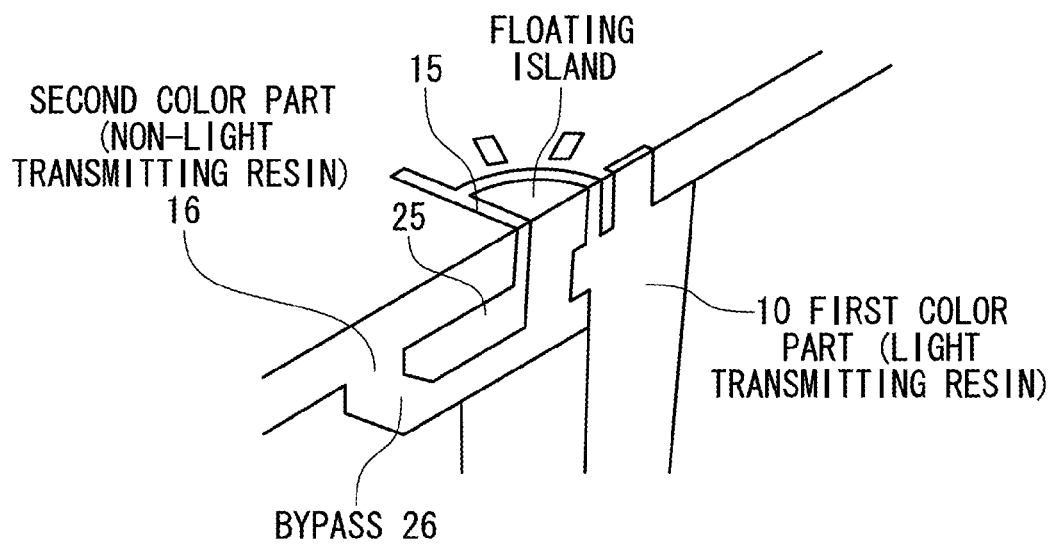
FIG. 10B is a view enlarging the vicinity of the display portion of FIG. 10A.

FIG. 10A is a perspective view of the switch knob cut along the dashed line indicated by the arrow D in FIG. 6. FIG. 10B is a view enlarging the vicinity of the display portion 15 of FIG. 10A. As shown in FIGS. 10A and 10B, in a case of two-color molding, a first color part is formed as the lock arm 10, the display portion 15 and the exposed portion 25 by a light transmitting resin, and a second color part is formed as the pressing portion 16 by a non-light transmitting resin. In the example of FIGS. 10A and 10B, a floating island is included in a shape of the display portion 15. The floating island is shaped by bypassing the bypass 26. The bypass 26 is formed by the light shielding member and covers a portion of the exposed portion 25, thereby hindering a portion of light irradiated to the exposed portion 25.

Figure 11:
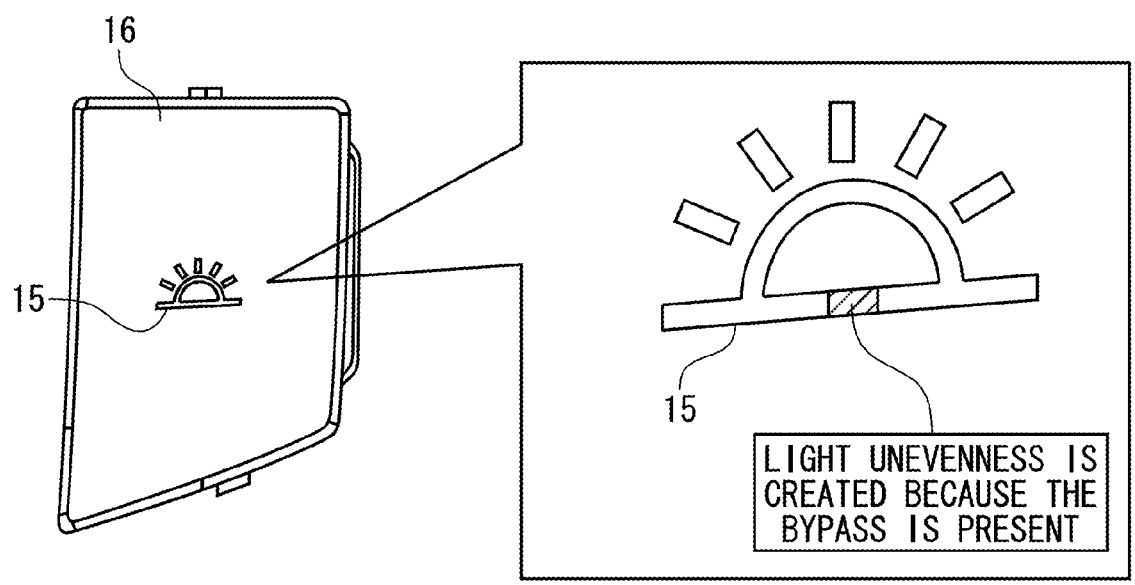
FIG. 11 is a view showing an influence of a bypass upon light-emitting of the display portion.

FIG. 11 is a view showing an influence of a bypass upon light emitting of the display portion. As shown in FIG. 11, the bypass 26 provided inside of the switch knob covers a portion of the exposed portion 25, and thus light unevenness in the display portion 15 is caused. To prevent such light unevenness, the display portion 15 is formed by a light guide member (a light transmitting resin) containing a diffusion material.

Figure 12A:
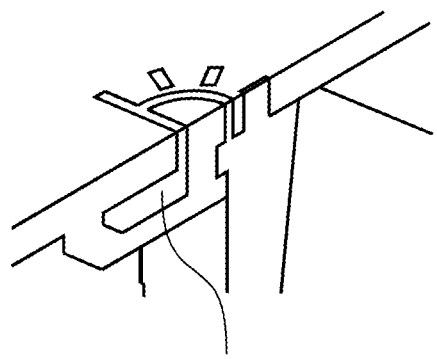
FIGS. 12A and 12B are views showing the display portion formed by a light guide member containing a diffusion material.
Figure 12B:
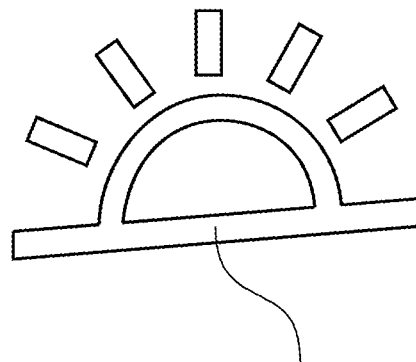

FIGS. 12A and 12B are views showing the display portion 15 formed by the light guide member containing the diffusion material. As shown in FIG. 12A, the diffusion material for dispersing light is incorporated into the display portion 15, and thus the light is scattered in the display portion 15. As a result, as shown in FIG. 12B, the shadow of the bypass 26 which covers a portion of the exposed portion 25 is reduced and thus the light unevenness is not conspicuous, as compared with FIG. 11.

Figure 13A:
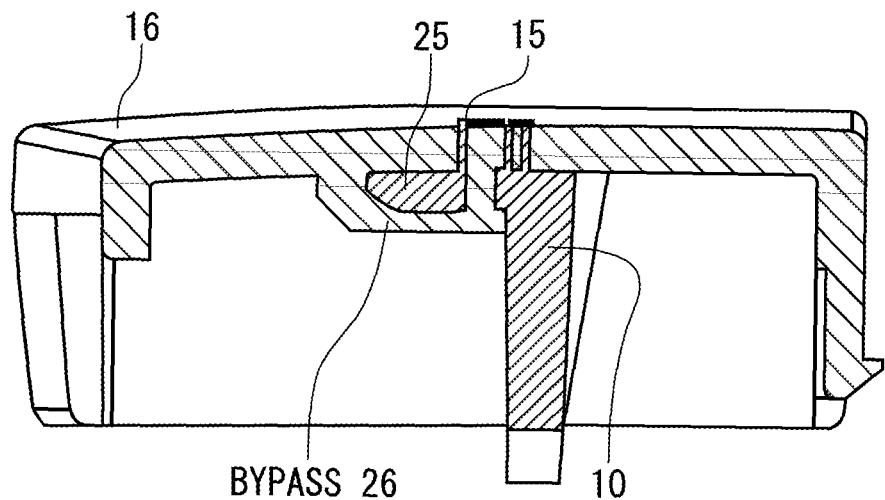
FIGS. 13A and 13B are views showing the bypass in which a portion thereof is cut off.
Figure 13B:
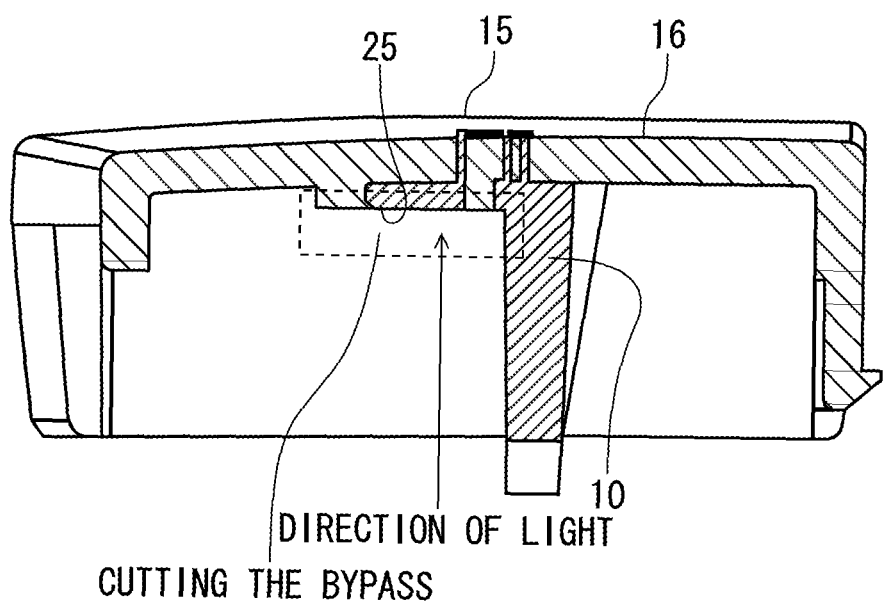
Figure 14:
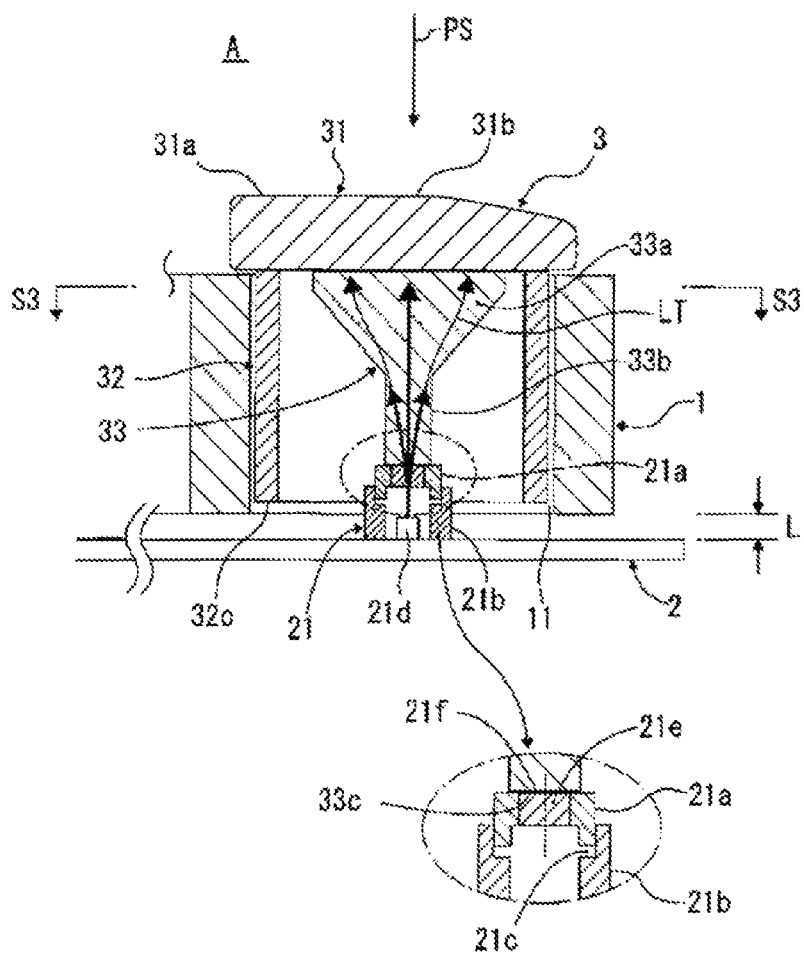
FIG. 14 is a view showing a structure of a conventional switch knob.
Figure 15A:
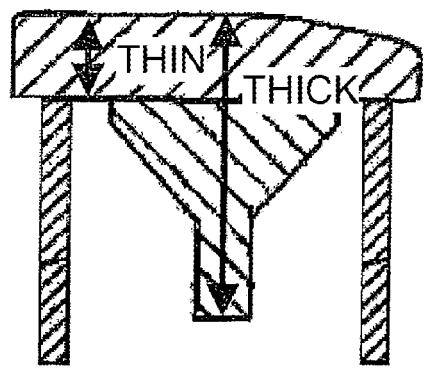
FIGS. 15A and 15B are views showing a sink mark created on the conventional switch knob.
Figure 15B:
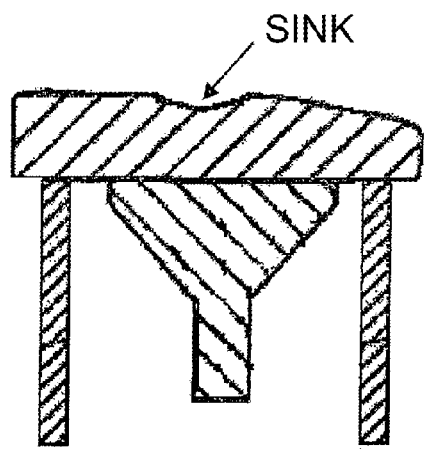

In addition, to prevent the light unevenness due to the bypass 26, a portion of the bypass 26 which covers the exposed portion 25 may be cut off after two-color molding. FIGS. 13A and 13B are views showing the bypass in which a portion thereof is cut off. As shown in FIG. 13B, the bypass 26 in FIG. 13A is removed. As a result, the entire surface of the exposed portion 25 is exposed to the inside of the switch knob so that light from the light source 19 is not hindered, thereby enhancing the illuminance of the display portion 15 and eliminating light unevenness due to the bypass 26.

INDUSTRIAL APPLICABILITY

The display switch according to the present invention is useful as a display switch, which is provided on a switch knob for a vehicle, and the like, because a required portion can be light-emitted as the display portion so that there is no need for light to be completely illuminated over the switch knob, and also the light guide portion and the light shielding portion are formed by different members so that a sink mark can be inhibited.

REFERENCE SIGNS LIST

1 vehicle illumination device
2 bezel
3 housing
4 lens
5 left switch knob
6 right switch knob
7 resin crip
8 wire harness sub-assembly
9 switch unit having light source
10 lock arm (holding portion)
11 lamp unit
13 hole
15 display portion
16 pressing portion
17 engaging portion
19 light source
20 engaging portion
22 body
23 protrution
25 exposed portion
26 bypass
29 push switch
30 held portion
39 substrate

The invention claimed is:
1. A display switch comprising:
a holding portion that is formed by a light guide member and adapted to hold a held portion;
a display portion that is integrally formed with the holding portion by the light guide member, and emits light by guiding a light irradiated to the holding portion; and
a light shielding portion that includes a first surface, a second surface, and perimeter wall extending from the first surface and along a perimeter of the light shielding portion, wherein
the holding portion extends away from the first surface and is spaced apart from the perimeter wall,
the display portion extends from the holding portion, the display portion extends through the light shielding portion from the first surface to the second surface, and the display portion includes a surface that is exposed at the second surface,
wherein the display portion and the light shielding portion are two-color-molded.

2. The display switch according to claim 1, wherein the display portion includes an exposed portion that extends along the first surface of the light shielding portion, and the exposed portion is exposed to a light source, and
the display portion emits light by guiding a light irradiated to the exposed portion from the light source.

3. The display switch according to claim 1, wherein the held portion is connected to a push switch for turning a light source on/off by pressing.

4. The display switch according to claim 1, wherein
the display portion includes a first portion that extends along the first surface of the light shielding portion,
the first portion is spaced apart from the holding portion, and
the light shielding portion includes a bypass that extends from the first surface of the light shielding portion, extends along the first portion, and abuts the holding portion such that a remainder of the first portion of the display portion is exposed.

5. The display switch according to claim 1, wherein the perimeter wall extends around the holding portion.

6. The display switch according to claim 1, wherein the perimeter wall includes an engaging portion configured to engage a housing if the display switch is received in the housing.

7. The display switch according to claim 1, wherein the holding portion includes a pair of engaging portions configured to engage the held portion.

8. A display switch comprising:
a substrate on which a light source and a push switch for turning on and off the light source are provided; and
a switch knob that is supported by a housing so as to be movable in an operation direction of the push switch,
wherein a display operation portion of the switch knob is lighted up with a light traveling from the light source from a back of the display operation portion,
the switch knob includes:
a pressing portion that is made of a non-light transmitting resin;
a display portion that is made of a light transmitting resin and extends from a front face to a back face of the pressing portion;
an exposed portion that is made of the light transmitting resin and formed to be integral with the display portion at a back of the pressing portion; and
a lock arm that is made of the light transmitting resin, formed to be integral with the exposed portion, extends in the operation direction of the push switch and supports the operating portion of the push switch,
the pressing portion includes a floating island surrounded by the display portion, and
a by-pass portion formed for injecting the non-light transmitting resin into the floating island portion does not include a portion closer to the light source than the exposed portion.

* * * * *